United States Patent [19]

Wu et al.

[11] Patent Number: 5,728,801

[45] Date of Patent: Mar. 17, 1998

[54] POLY (ARYLAMINES) AND FILMS THEREOF

[75] Inventors: Weishi Wu; Edmund P. Woo; William R. Shiang, all of Midland, Mich.

[73] Assignee: The Dow Chemical Company, Midland, Mich.

[21] Appl. No.: 696,281

[22] Filed: Aug. 13, 1996

[51] Int. Cl.$^6$ .................................................. C08G 73/00
[52] U.S. Cl. .................... 528/422; 528/480; 528/485; 528/503; 427/384; 427/385.5; 428/424.2; 428/424.6; 428/457
[58] Field of Search ................... 528/422, 480, 528/485, 503; 427/384, 385.5; 428/424.2, 424.6, 457

[56] References Cited

U.S. PATENT DOCUMENTS

| | | |
|---|---|---|
| 4,356,429 | 10/1982 | Tang . |
| 4,539,507 | 9/1985 | VanSlyke et al. . |
| 4,885,211 | 12/1989 | Tang et al. . |
| 5,047,687 | 9/1991 | VanSlyke . |
| 5,059,862 | 10/1991 | VanSlyke et al. . |
| 5,061,561 | 10/1991 | Katayama . |
| 5,256,945 | 10/1993 | Imai et al. . |
| 5,352,554 | 10/1994 | Mishima et al. . |
| 5,352,834 | 10/1994 | Morishita et al. . |

FOREIGN PATENT DOCUMENTS

| | | |
|---|---|---|
| 0 372 979 | 5/1990 | European Pat. Off. . |
| 0 443 861 A2 | 8/1991 | European Pat. Off. . |
| 0 517 542 A1 | 12/1992 | European Pat. Off. . |
| 0 637 899 A1 | 2/1995 | European Pat. Off. . |
| 0 710 893 A1 | 5/1996 | European Pat. Off. . |
| 0 721 935 A1 | 7/1996 | European Pat. Off. . |
| 95/09147 | 4/1995 | WIPO . |
| 97/09394 | 3/1997 | WIPO . |

OTHER PUBLICATIONS

Colon, et al., *Journal of Polymer Science, Part A, Polymer Chemistry*, vol. 28, pp. 367–383 (1990).
Pai D. M. et al., *Journal Phys. Chem.*, vol. 88, pp. 4714–4717 (1984).
Tang, C. W. et al., *Appl. Phys. Lett.*, vol. 51, pp.91–915 (1987).
Adachi, Chihaya et al., *Appl. Phys. Lett.*, vol. 56, pp. 799–801 (1990).
Kido, Junji et al., *Appl. Phys. Lett.*, vol. 61, pp. 761–763 (1992).
Gautlich, Sylvie, et al., *Synthesis.*, pp. 383–385 (1987).
Guram, Anil S. et al. *Angewandte Chemie Int'l. Ed. in English*, vol. 34, pp. 1348–1350 (1995).
loyda et al., *Bulletin of the Chemical Society of Japan*, vol. 63, pp. 80–87 (1990).
Miyama et al., *Synthetic Communication*, vol. 11, pp. 513–519 (1981).
Wallow et al., *American Chemical Society Polymer Preprint*, vol. 34(1), pp. 1009–1010 (1993).

Yamamoto, Takakazu, *Progress in Polymer Science*, vol. 17, pp. 115–1205 (1992). Abstract of JP 05311163–A.
Adachi, Chihaya et al., "Confinement of Charge Carriers and Molecular Excitons with in 5–nm–thick Emitter Layer in Organic Electroluminescent Devices with a Double Heterostructure", APPL. PHYS. LETT., vol. 57, No. 6 (Aug. 6, 1990).
Baker, T. Nelson, III et al., "Electrophillic Substitution Reactions of Triphenylamine", Journal of Organic Chemistry, vol. 30, pp. 3714–3718 (Nov. 1965).
Chemical Abstract, 93–365193/46 (1993).
Ishikawa, Masazumi et al., "Synthesis and Properties of Electrically Conducting Polytriphenylamines", SYNTHETIC METALS, vol. 40, pp. 231–238 (1991).
Ishikawa Wataru et al., "Novel Amorphous Molecular Materials: The Starburst Molecule 1,3,5–Tris [N–(4–diphenylaminophenyl)–phenylamino]benzene", Advanced Materials, vol 5, No. 7/8, pp. 559–561 (1993).
Kuwabara, Yoshiyuki et al., "Thermally Stable Multilayered Organic Electroluminescent Devices Using Novel Starburst Molecules, 4,4', 4"–Tri(N–carbazolyl)triphenylamine (TCTA) and 4,4', 4"–Tris(3–methylphenylphenylamino)triphenylamine (m–MTDATA), as Hole–Transport Materials", Advance Materials, vol. 6, No. 9, pp. 677–679 (1994).
Derwent 97–359265/199733 (JP 915137 A).

*Primary Examiner*—Duc Truong
*Attorney, Agent, or Firm*—Ann K. Galbraith; Jill V. Blasy

[57] ABSTRACT

A poly(arylamine) composition comprising one or more compounds of Formula (I):

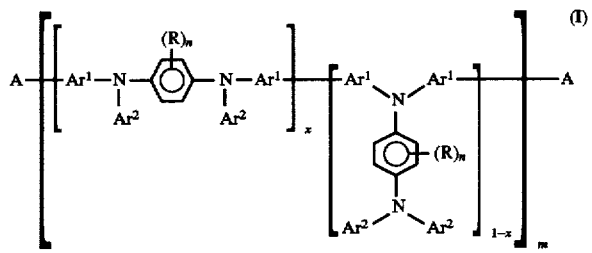

wherein:

R is independently in each occurrence a $C_{1-24}$ hydrocarbyl, $C_{1-24}$ hydrocarboxy, $C_{1-24}$ hydrocarbylthiooxy, or $C_{1-24}$ hydrocarbylcarboxyl;

$Ar^1$ and $Ar^2$ are independently in each occurrence a $C_{6-18}$ aryl moiety optionally substituted with a $C_{1-12}$ hydrocarbyl, $C_{1-12}$ hydrocarbyloxy, $C_{1-12}$ hydrocarbylthiooxy, or $C_{1-12}$ hydrocarbylcarboxyl;

A is independently in each occurrence hydrogen or a halogen;

x is independently in each occurrence a positive number from 0 to 1;

n is independently in each occurrence a whole number of from 0 to 4; and m is a number of from about 5 to about 1000.

17 Claims, No Drawings

POLY (ARYLAMINES) AND FILMS THEREOF

BACKGROUND OF THE INVENTION

This invention relates to poly(arylamines), methods for the preparation of poly(arylamines) and films thereof. The films of the poly(arylamines) are useful as charge transport layers in light-emitting diodes.

Triarylamines, as evidenced by their low oxidation potentials, are easily oxidized to the corresponding radical cations. The cations are equally easily reduced to the neutral starting amines. This oxidation/reduction process is reversible and can be repeated many times. For this reason, triarylamines are widely used as charge transport materials, specifically for the transport of holes (positive charges).

Charge transport materials are essential to the efficient operation of electrophotographic devices (copying machines and printers) and electroluminescent devices such as light-emitting diodes. In both applications, the triarylamines are used in film form. For electrophotographic applications, a triarylamine and a polymeric binder are dissolved in a suitable solvent and the resulting solution used for coating, see U.S. Pat. Nos. 5,352,554 and 5,352,834. To obtain a film of useful charge transport properties, the loading of triarylamine in the final formulation must be as high as possible. In low concentrations, the triarylamine will act to trap charge carriers instead of transporting them, D. M. Pai, J. F. Yanus, M. Stolka., *J. Phys. Chem.*, Vol. 88, p. 4714 (1984). If the triarylamine compound separates out from the polymer binder or crystallizes into a fine dispersion of crystals in the polymer binder, the film can no longer serve its intended purpose.

Organic electroluminescent devices are typically constructed by sandwiching an organic film or a stack of organic films between an anode and a cathode such that when voltage is applied, holes and electrons are injected and transported into the device. The combination of holes and electrons within the organic layer leads to excitons which can undergo radiative decay to the ground state, emitting the excitation energy in the form of light. For the light to be seen, it is necessary that one of the electrodes be transparent. A major improvement in device efficiency was achieved when a film of a triarylamine was deposited by conventional vapor-phase deposition between the emitting film and the anode, see C. W. Tang, S. A. Van Slyke, *Appl. Phys. Lett.*, Vol. 51, p. 913 (1987), and U.S. Pat. No. 4,539,507. One of the problems associated with devices of this type is the tendency of the organic films to crystallize due to the heat evolved during operation, see C. Adachi, T. Tsutsui, S. Saito, *Appl. Phys. Lett.*, Vol. 56, p. 799 (1990). Contacts between organic layers and electrodes may be destroyed by crystallization, leading to device failure, see J. Kido, M. Kohda, *Appl. Phys. Lett.*, Vol. 61, p. 761 (1992).

Copolymers consisting of aromatic amide and triarylamine groups have been taught as hole-transporting layers in electroluminescent devices, see Japanese Patent 0531163-A. These copolymers are less desirable for use in electroluminescent devices as the concentration of the active triarylamine groups are depressed by the presence of the amide comonomer.

What is needed are relatively high molecular weight charge transport compounds which are capable of forming films. What is needed are films which can be prepared using relatively small amounts of polymer while still maintaining the desirable properties of transporting positive charges. What is also needed are polymeric light-emitting diode devices prepared from such films. What is also needed are processes for the preparation of such compounds.

SUMMARY OF THE INVENTION

The invention is a poly(arylamine) composition comprising one or more compounds corresponding to Formula (I):

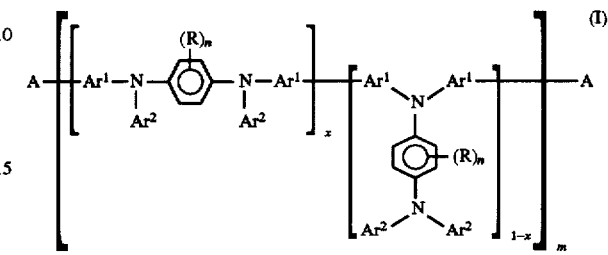

wherein:

R is independently in each occurrence a $C_{1-24}$ hydrocarbyl, $C_{1-24}$ hydrocarbyloxy, $C_{1-24}$ hydrocarbylthiooxy, or $C_{1-24}$ hydrocarbylcarboxyl;

$Ar^1$ and $Ar^2$ are independently in each occurrence a $C_{6-18}$ aryl moiety optionally substituted with one or more $C_{1-24}$ hydrocarbyl, $C_{1-24}$ hydrocarbyloxy, $C_{1-24}$ hydrocarbylthiooxy, or $C_{1-24}$ hydrocarbylcarboxyl;

A is independently in each occurrence hydrogen or a halogen;

x is independently in each occurrence a positive number from 0 to 1;

n is independently in each occurrence a whole number of from 0 to 4; and m is a number of from about 5 to about 1000.

The invention further relates to films prepared from such poly(arylamines), as well as electrophotographic devices and electroluminescent devices containing such films, such as polymeric light-emitting diodes.

The invention also relates to processes for the preparation of poly(arylamines). One such process comprises contacting one or more monomers such as a dihalogenated tetraaryl-1, 2-phenylenediamine with a catalytic amount of a divalent nickel salt, at least a stoichiometric amount of a material capable of reducing the divalent nickel ion to the zero valent state, a material capable of acting as a ligand and an amount of a compound capable of accelerating the reaction in a polar solvent, and an optional co-solvent comprising an aromatic hydrocarbon or ether, under conditions such that one or more poly(arylamines) are prepared.

The polymers of the invention form films which are relatively high molecular weight charge transport compounds which are capable of forming films. The films can be prepared using relatively small amounts of polymer while still maintaining the desirable properties of transporting positive charges. The processes disclosed herein provide efficient means of preparing the disclosed compounds. These and other advantages of the invention will be apparent from the description which follows.

DETAILED DESCRIPTION OF THE INVENTION

Preferably, R is independently in each occurrence a $C_{1-12}$ hydrocarbyl, $C_{1-12}$ alkoxy, $C_{1-12}$ thioalkoxy, $C_{1-12}$ aryloxy, $C_{1-12}$ thioaryloxy moiety or a $C_{1-12}$ hydrocarbyl moiety which is optionally substituted with a $C_{1-12}$ alkoxy, $C_{1-12}$ thioalkoxy, $C_{1-12}$ aryloxy, and $C_{1-12}$ thioaryloxy moiety.

More preferably, R is independently in each occurrence a $C_{1-5}$ alkoxy, $C_{1-5}$ thioalkoxy or a $C_{1-6}$ hydrocarbyl. Most preferably, R is independently in each occurrence methyl or methoxy;

Preferably, $Ar^1$ and $Ar^2$ are independently in each occurrence a $C_{6-18}$ aromatic radical optionally substituted with $C_{1-12}$ hydrocarbyl, $C_{1-12}$ alkoxy, $C_{1-12}$ thioalkoxy, $C_{1-12}$ aryloxy, and $C_{1-12}$ thioaryloxy moieties. More preferably, $Ar^1$ and $Ar^2$ are independently in each occurrence a phenyl, naphthyl or biphenyl group, optionally substituted with $C_{1-5}$ alkoxyl or $C_{1-6}$ alkyl. Even more preferably, $Ar^1$ and $Ar^2$ are independently in each occurrence derived from anisole, methoxynapthalene, methoxybiphenyl, phenyl or toluene. Most preferably, $Ar^1$ is phenyl and $Ar^2$ is independently in each occurrence 4-methoxyphenyl or phenyl.

Preferably, A is independently in each occurrence hydrogen, chlorine, or bromine.

Preferably, n is a number of 0 or 1. More preferably, n is 0.

Preferably, m is a number of from about 5 to about 500. More preferably, m is a number of from about 5 to about 100.

The poly(arylamines) of the invention demonstrate strong photo-luminescence in dilute solutions or in the solid state. When such materials are exposed to light of a wavelength of about 300 to about 700 nanometers, the materials emit light of wavelengths in the region of about 400 to about 800 nanometers. More preferably, such materials absorb light of wavelengths of from about 300 to about 400 nanometers and emit light of wavelengths in the region of about 400 to about 650 nanometers. The poly(arylamines) of the invention are readily soluble in common organic solvents. They are processable into thin films or coatings by conventional techniques. The poly(arylamines) of the invention preferably have oxidation potentials of about +0.1 volt or greater, more preferably +0.4 volt or greater and preferably +1.0 volt or less, more preferably +0.7 volt or less.

The poly(arylamines) of this invention preferably have a weight average molecular weight of about 250 Daltons or greater, more preferably about 500 Daltons or greater, even more preferably about 1,000 Daltons or greater; preferably about 1,000,000 Daltons or less, more preferably about 500,000 Daltons or less and most preferably about 50,000 Daltons or less. Molecular weights are determined according to gel permeation chromatography using polystyrene standards.

Preferably, the poly(arylamines) demonstrate a polydispersity $(M_w/M_n)$ of 5 or less, more preferably 4 or less, even more preferably 3 or less and most preferably 2.5 or less.

The monomers useful in the preparation of the poly (arylamines) preferably comprise two amino moieties wherein each amino moiety is bound to three aryl moieties wherein two halo moieties are optionally bound to the monomers. Preferably, the poly(arylamines) comprise from about 5 to about 1000 of the monomers. Preferably, the monomers useful in the preparation of the poly(arylamines) of this invention are illustrated in Formulas (II) and (III):

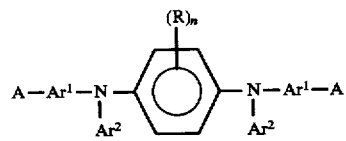
(II)

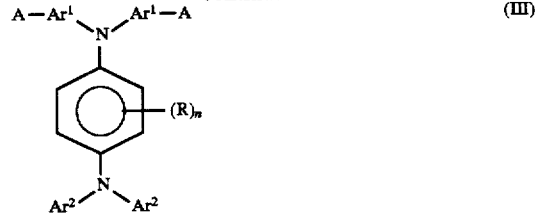
(III)

wherein A, $Ar^1$, $Ar^2$ R and n are as previously defined. A preferred monomer is dihalogenated N,N,N',N'-tetraaryl-1,4-phenylenediamine. Such halogenated monomers may be prepared, for example, by contacting one or more diaryldiamines with a haloaromatic compound under reaction conditions sufficient to form the corresponding monomer of Formula (II) or (III). Diaryldiamines useful for this purpose are shown in Formulas (IV) and (V):

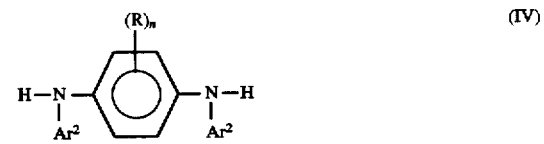
(IV)

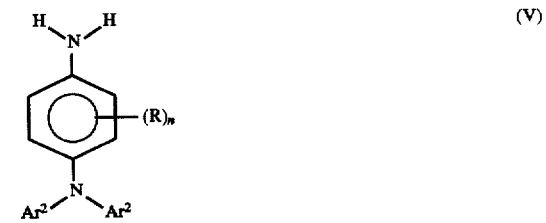
(V)

wherein A, $Ar^1$, $Ar^2$, R and n are as previously defined. Such diaryldiamines may be compounds such as N,N'-diaryl-1,4-phenylenediamine or N,N-diaryl-1,4-phenylenediamine.

The diaryldiamines are contacted with a haloaromatic compound under conditions such that one or more monomers are prepared. Preferably, the contacting of the diaryldiamines with a haloaromatic compound is performed according to the procedures of Gauthier and Frechet in *Synthesis*, p. 383 (1987), incorporated herein by reference, or according to the procedures of Guram, Rennels and Buchwald, *Angewandte Chemie International Edition in English*, Vol. 34, p. 1348 (1995), incorporated herein by reference. The diaryldiamines and haloaromatic compounds are contacted and heated in the presence of copper powder and potassium carbonate or the contacting is performed in the presence of sodium t-butoxide and a catalyst comprising a palladium compound and tri-o-tolylphosphine. Preferably, if copper powder and potassium carbonate are used as starting materials, an iodoaromatic compound may be used. Preferably, if sodium t-butoxide and a catalyst comprising a palladium compound and tri-o-tolylphosphine are used as starting materials, a bromoaromatic compound may be used.

The haloaromatic compound includes compounds of Formula (VI):

$A—Ar^1—B$ (VI)

wherein A and B are independently in each occurrence hydrogen or a halogen and $Ar^1$ is as previously defined. Preferably, A is individually in each occurrence hydrogen, chlorine or bromine and B is individually in each occurrence bromine or iodine. The amount of haloaromatic compound used is enough to fully substitute the amine nitrogen atoms of the diaryldiamine present in the reactant mixture. Preferably, the diaryldiamines are contacted with a haloaromatic compound in a mole ratio of about 1:10 or less, more preferably in a ratio of about 1:5 or less and even more preferably in a ratio of about 1:3 or less.

The reactants to prepare the monomers are heated to a temperature at which the reaction proceeds at a rate sufficient to form the monomers. Preferably, the reaction temperature is about 100° C. or greater, more preferably about 120° C. or greater and even more preferably about 150° C. or greater. Preferably, the reaction temperature is about 300° C. or less, more preferably about 250° C. or less and even more preferably about 200° C. or less. The reaction time is dependent upon the reaction temperature, the amount of catalyst and the concentration of the reactants. Reaction times are preferably about 5 hours or greater, more preferably about 10 hours or greater and even more preferably about 20 hours or greater. Reaction times are about 50 hours or less, more preferably about 40 hours or less and most preferably about 30 hours or less.

The amount of solvent used in this process can vary over a wide range. Generally, it is desirable to use as little solvent as possible. Preferably, about 1 liter of solvent per mole of diaryldiamines or less is used, more preferably about 0.5 liter or less is used, and most preferably about 0.1 liter or less is used. The lower limit on amount of solvent used is determined by practicality, that is, handleability of the solution and solubility of the reactants and products in the solvent.

The poly(arylamines) of the invention may be prepared by a halide coupling reaction (hereinafter "polymerization reaction") carried out in the presence of a catalytic amount of a divalent nickel salt, at least a stoichiometric amount of zinc powder, a trisubstitued phosphine and an amount of a compound capable of accelerating the coupling reaction in a polar solvent and an optional co-solvent comprising an aromatic hydrocarbon or ether. The nickel (zero valent) catalyst is prepared in situ by contacting a divalent nickel salt with a reducing agent in the presence of a material capable of acting as a ligand and, optionally, a material capable of accelerating the reactions.

In a preferred embodiment, the poly(arylamines) of the invention are prepared by contacting the monomers in the presence of a nickel catalyst according to the procedures of Colon et al., described in *Journal of Polymer Science, Part A, Polymer Chemistry Edition*, Vol. 28, p. 367 (1990), incorporated herein by reference, and Colon et al., *Journal of Organic Chemistry*, Vol. 51, p. 2627 (1986), the relevant parts of which are incorporated herein by reference.

The polymerization reaction is preferably carried out in a polar solvent, preferably dimethylformamide, N,N-dimethylacetamide, N-cyclohexylpyrrolidinone or N-methylpyrrolidinone. Up to about 50 volume percent of a non-amide co-solvent can be used. Preferable co-solvents are aromatic hydrocarbons and ethers, for instance, tetrahydrofuran. The process is preferably conducted in the absence of oxygen and moisture, as the presence of oxygen is detrimental to the catalyst and the presence of a significant amount of water leads to premature termination of the process. More preferably, the reaction is performed under an inert atmosphere such as nitrogen or argon.

The catalyst is preferably formed from a divalent nickel salt. The nickel salt may be any nickel salt which can be converted to the zero valent state under reaction conditions. Preferable nickel salts are the nickel halides, with nickel chloride and nickel bromide most preferred. The divalent nickel salt is present in an amount of about 0.01 mole percent or greater, more preferably about 0.1 mole percent or greater and most preferably about 1.0 mole percent or greater, based on the amount of monomer present. The amount of divalent nickel salt present is preferably about 30 mole percent or less, more preferably about 15 mole percent or less, based on the amount of monomer present.

The nickel-catalyzed polymerization reaction is performed in the presence of a material capable of reducing the divalent nickel ion to the zero valent state. Suitable material includes any metal which is more easily oxidized than nickel. Preferable metals include zinc, magnesium, calcium and lithium. The preferred reducing agent is zinc in the powder form. At least stoichiometric amounts of reducing agent based on the amount of nickel is required to maintain the nickel species in the zero valent state throughout the reaction. Preferably, the reducing agent is present in an amount of about 150 mole percent or greater, more preferably about 200 mole percent or greater, and most preferably about 250 mole percent or greater, based on the amount of monomer is used. Preferably, the reducing agent is present in an amount of about 500 mole percent or less, more preferably about 400 mole percent or less and most preferably about 300 mole percent or less, based on the amount of monomer.

The polymerization reaction is performed in the presence of a material capable of acting as a ligand. Preferred ligands include trihydrocarbylphosphines. More preferred ligands are triaryl or trialkylphosphines, with triphenylphosphines being the most preferred. The compound capable of acting as a ligand is present in an amount of from about 10 mole percent or greater, more preferably about 20 mole percent or greater, based on the amount of monomer. The compound capable of acting as a ligand is preferably present in an amount of about 100 mole percent or less, more preferably about 50 mole percent or less, and most preferably about 40 mole percent or less, based on the amount of monomer.

The polymerization reaction can be performed at any temperature at which the reaction proceeds at a reasonable rate. Preferably, the reaction is performed at a temperature of about 25° C. or greater, more preferably about 50° C. or greater, and most preferably about 70° C. or greater. Below about 25° C., the rate of reaction is unacceptably low. Preferably, the reaction is performed at a temperature of about 200° C. or less, more preferably about 150° C. or less, and most preferably about 125° C. or less. Temperatures substantially higher than about 200° C. can lead to degradation of the catalyst. The reaction time is dependent upon the reaction temperature, the amount of catalyst and the concentration of the reactants. Reaction times are preferably about 1 hour or greater and more preferably about 10 hours or greater. Reaction times are about 100 hours or less, more preferably about 72 hours or less and most preferably about 48 hours or less. The amount of solvent used in this process can vary over a wide range. Generally, it is desirable to use as little solvent as possible. Preferably, about 10 liters of solvent per mole of monomer or less are used, more preferably about 5 liters or less are used, and most preferably about 2 liters or less are used. The lower limit on amount of solvent used is determined by practicality, that is, handleability of the solution and solubility of the reactants and products in the solvent.

In another embodiment, the poly(arylamines) of the invention may be prepared by a process disclosed in Ioyda et al., *Bulletin of the Chemical Society of Japan*, Vol. 63, p. 80 (1990), relevant parts incorporated herein by reference. Such method is similar to the method described hereinbefore. In particular, the catalyst is a divalent nickel salt introduced as a nickel halide bis-triphenylphosphine complex. The reaction may be performed in a variety of polar solvents. These solvents can include acetone, dimethylformamide, tetrahydrofuran and acetonitrile. The reaction is accelerated by the addition of about 10 mole percent of an organo-soluble iodide such as tetraethylammonium iodide. Such a reaction is performed at a temperature of from about 20° C. to about 100° C. for about 1 to about 24 hours.

In another embodiment, the poly(arylamines) of the invention may be prepared via the process disclosed by Yamamoto, *Progress in Polymer Science*, Vol. 17, p. 1153 (1992), relevant parts incorporated herein by reference. Such method is similar to the method described hereinbefore. In such process, the monomers are contacted with at least a stoichiometric amount of nickel catalyst in the form of nickel (1,5-cyclooctadiene) complex and at least a stoichiometric amount of 1,5-cyclooctadiene as a ligand in an inert solvent, such as tetrahydrofuran. The reaction is preferably conducted at about 70° C. or higher for about two or more days.

In another embodiment, the poly(arylamines) of the invention may be prepared by the process disclosed in Miyaura et al., *Synthetic Communication*, Vol. 11, p. 513 (1981), and Wallow et al., *American Chemical Society Polymer Preprint*, Vol. 34 (1), p. 1009 (1993), relevant parts of both references incorporated herein by reference. In such process, the halogens on the monomers are converted to the corresponding lithio- or Grignard moieties. Such processes are well known in the art, see for example March, *Advanced Organic Chemistry*, 2d Ed., pp. 408–414 (McGraw-Hill, 1977). The resulting lithio- or Grignard derivatives are reacted with a trialkyl borate to form the corresponding boronic acid: M. Rehalin et al., as disclosed in *Makromoleculaire Chemie*, Vol. 191, pp. 1991–2003 (1990), relevant parts incorporated herein by reference. The resulting boronic acid derivatives are contacted in the presence of a catalytic amount of tetrakis(triphenylphosphine)-palladium(0) and an aqueous base under conditions such that the poly (arylamines) of the invention are prepared.

The tetrakis(triphenylphosphine)-palladium(0) may be generated in situ by the addition of a soluble palladium salt (for instance palladium acetate or palladium chloride) and at least four molar equivalents of triphenylphosphine. The catalyst is present in a sufficient amount to promote the desired reaction and to facilitate a reasonable rate of reaction. Preferably, the catalyst is present in an amount of about 0.01 mole percent or greater, more preferably about 0. 1 mole percent or greater, and most preferably about 1.0 mole percent or greater, based on the amount of monomer present. The tetrakis(triphenylphosphine)-palladium(0) is preferably present in an amount of about 20 mole percent or less, more preferably about 10 mole percent or less, and most preferably about 5 mole percent or less, based on the amount of monomer.

The above reactants are contacted in a solvent which does not react with the reactants or deactivate the catalysts. Preferable solvents include aromatic hydrocarbons, lower alkanols, aliphatic ethers and N,N-dialkylamides, with toluene and ethanol being more preferred.

The process as disclosed in Miyaura et al. is preferably conducted in the absence of oxygen, as the presence of oxygen is detrimental to the catalyst. More preferably, the reaction is performed under an inert atmosphere such as nitrogen or argon.

The above reaction can be performed at any temperature at which the reaction proceeds at a reasonable rate. Preferably, the reaction is performed at a temperature of about 50° C. or greater, more preferably about 70° C. or greater, and most preferably about 80° C. or greater. Below about 50° C., the rate of reaction is unacceptably low. Preferably, the reaction is performed at a temperature of about 150° C. or less, more preferably about 130° C. or less, and most preferably about 100° C. or less. Temperatures substantially higher than about 150° C. can lead to degradation of the catalyst. The reaction time is dependent upon the reaction temperature, the amount of catalyst and the concentration of the reactants. Reaction times are preferably about 10 hours or greater and more preferably about 20 hours or greater. Reaction times are about 100 hours or less, more preferably about 50 hours or less, and most preferably about 20 hours or less. The amount of solvent used in this process can vary over a wide range. Generally, it is desirable to use as little solvent as possible. Preferably, about 100 liters of solvent per mole of diaryldiamine or less is used, more preferably about 75 liters or less, and most preferably about 50 liters or less. The lower limits on amount of solvent used is determined by practicality, that is, handleability of the solution and solubility of the reactants and products in the solvent.

The poly(arylamines) resulting from all of the above methods of preparation are recovered according to conventional techniques; preferred techniques include filtration and precipitation using a nonsolvent. The poly(arylamines) are useful in preparing coatings and films.

Such coatings and films can be useful as charge transport layers in polymeric light-emitting diodes, in protective coatings for electronic devices and as fluorescent coatings. Polymeric light emitting diode devices contain an electroluminescent substance placed between a pair of electrodes. When electric potential is applied across the electrodes, the electroluminescent substance emits visible light. Typically, one of the electrodes is transparent, permitting the light to shine through. The device contains an anode and a cathode with a hole transport layer and an electron transport layer as the electroluminescent substance between the anode and cathode. For examples of such devices, see U.S. Pat. Nos. 4,356,429, 4,539,507, 4,885,211, 5,047,687, 5,059,862 and 5,061,561, all of which are incorporated herein by reference. The thickness of the coating or film is dependent upon the ultimate use. Generally, such thickness can be from about 0.01 to about 200 microns. In that embodiment wherein the coating is used as a fluorescent coating, the coating or film thickness is from about 50 to about 200 microns. In that embodiment where the coatings are used as electronic protective layers, the thickness of the coating can be from about 5 to about 20 microns. In that embodiment where the coatings are used in a polymeric light-emitting diode, the thickness of the layer formed is about 0.05 to about 2 microns. The poly(arylamines) form good pinhole- and defect-free films. Such films can be prepared by means well known in the art, including spin-coating, spray-coating, dip-coating and roller-coating. Such coatings are prepared by a process comprising applying a composition to a substrate and exposing the applied composition to conditions such that a film is formed.

In a preferred embodiment, the composition applied to the substrate comprises the poly(arylamines) dissolved in a common organic solvent. Preferred solvents are aliphatic hydrocarbons, chlorinated hydrocarbons, aromatic hydrocarbons, ketones, ethers and the like. It is preferable that such solvents have relatively low polarity. Preferably, the solution contains from about 0.5 to about 10 weight percent of the poly(arylamine). For thin coatings, it is preferred that the composition contains from about 0.5 to about 5.0 percent by weight of the poly(di(triarylamine).

This composition is then applied to the appropriate substrate by the desired method. The films are preferably substantially uniform in thickness and substantially free of pinholes.

SPECIFIC EMBODIMENTS

The following examples are included for illustrative purposes only and do not limit the scope of the claims. Unless otherwise stated, all parts and percentages are by weight.

Glass transition temperatures of polymers were determined by differential scanning calorimetry. Inherent viscosity measurements were conducted at 25° C., 0.5 dL/g. Molecular weights were determined by gel permeation chromatography against polystyrene standards. Cyclic voltammetric analyses were performed with Ag/AgCl as reference; oxidation potentials were determined either with dichloromethane solutions or with polymer films deposited on platinum electrodes.

EXAMPLE 1

Preparation of the monomer: N,N'-diphenyl-N,N'-di-(4-methoxyphenyl)-1,4-phenylenediamine N,N'-diphenyl-1,4-phenylenediamine (46.3 g, 0.18 mol), 4-iodophenylmethylether (100.0 g, 0.43 mol), copper bronze powder (28 g, 0.44 mol), potassium carbonate (166 g, 1.2 mol), 18-crown-6 ether (7.9 g, 0.03 mol), and 1,2-dichlorobenzene (400 mL) were added to a reactor equipped with a mechanical stirrer, a nitrogen inlet and a condenser was added. The mixture was heated at 180° C. for 90 hours while the water produced by the reaction was removed with a slow flow of nitrogen. After 24 hours, the hot reaction mixture was filtered through a bed and concentrated under reduced pressure to afford dark brown viscous liquid which was percolated through a bed of silica gel with hexane to remove some of the color. Recrystallization twice from acetone afforded 55.7 g (66%) of tan-colored crystals of the monomer.

EXAMPLE 2

Preparation of the monomer: N,N'-di-(4-bromophenyl)-N,N'-di-(4-methoxyphenyl)-1,4-phenylenediamine A solution of N-bromosuccimide (19.0 g, 0.11 mol) and dimethyl formamide (DMF) (150 mL) was added to a stirred solution of N,N'-diphenyl-N,N'-di(4-methoxyphenyl)-1,4-phenylenediamine (25.0 g, 0.053 mol) in DMF (150 mL). The reaction mixture was added to 1 L of toluene and heated to 60° C. The warm solution was washed with water (4×1000 mL) at 60° C. The toluene solution was dried over anhydrous $MgSO_4$, filtered through a bed of silica gel, then concentrated under reduced pressure. Two recrystallizations of the crude product from toluene/hexane gave tan-colored crystals of the monomer (21.6 g, 65%) after drying.

EXAMPLE 3

Polymerization of N,N'-di-(4-bromophenyl)-N,N'-di-(4-methoxyphenyl)-1,4-phenylenediamine A polymerization reactor was charged with N,N'-di-(4-bromophenyl)-N,N'-di-(4-methoxyphenyl)-1,4-phenylenediamine (6.3 g, 10 mmol), triphenylphosphine (1.35 g, 5 mmol), zinc powder (2.0 g, 30 mmol) and nickel chloride-2,2'-bipyridine complex ($NiCl_2$-Bipy) (0.1 g, 0.45 mmol). The reactor was evacuated to ~0.2 mmHg then purged with nitrogen; this cycle was repeated 7 times. To the reactor was added (via syringe) 20 mL of anhydrous dimethyl acetamide (DMAc). The reaction mixture was heated to 80° C. with a stirring rate of 250 rpm. After a few minutes the reaction mixture turned from gray to a brownish-red color which became darker with time. After 1 hour, a solid green cake was formed and mixing was difficult. To the reactor was added 25 mL of DMAc and 40 mL of toluene to dissolve the solid cake. The reaction was stirred at 80° C. for 18 hours. The reaction mixture was added to 500 mL of acetone, precipitating out the product. The precipitate was collected and washed with acetone (3×150 mL). The precipitate was dissolved in 300 mL of chlorobenzene then filtered through a bed of filter aid. The chlorobenzene solution was washed with 300 mL of aqueous 3N HCl and water (2×300 mL). The chlorobenzene mixture was then added to a flask containing 100 mL of water and 50 mL of ethylenediamine. The mixture was stirred at 60° C. for 2 hours. The aqueous layer of the chlorobenzene mixture was removed and the toluene layer of the chlorobenzene mixture was washed with water (3×200 mL). The chlorobenzene mixture was concentrated to a volume of ~50 mL then slowly added to 300 mL of acetone. The polymer was formed as a yellow precipitate. The yellow precipitate was collected, washed with acetone (2×200 mL) then dried to afford 4.4 g (94%) of a yellow powder. The properties of the polymer are listed in Table I. The polymer of this example is useful for hole transport materials in light-emitting diode devices.

EXAMPLE 4

Polymerization of N,N'-di-(4-bromophenyl)-N,N'-di-(4-methoxyphenyl)-1,4-phenylenediamine The above example was repeated with N,N'-di-(4-bromophenyl)-N,N'-di-(4-methoxyphenyl)-1,4-phenylenediamine (6.3 g, 10 mmol), triphenylphosphine (1.31 g, 50 mmol), zinc powder (2.0 g, 30 mmol), $NiCl_2$-Bipy (0.086 g, 0.3 mmol), and N-methylpyrrolidinone (20 mL). The polymerization was terminated after about 6 hours. The polymer cake was dissolved in toluene (200 mL) and the resulting mixture filtered through a bed to remove the inorganic salts. The filtered toluene solution was reduced to about 50 mL volume and was then poured into about 800 mL of acetone to precipitate the desired polymer. The solid was collected by filtration and dried in a vacuum oven overnight at 60° C. to give 3.47 g of yellow polymer whose inherent viscosity in toluene was 0.08 dL/g. The polymer of this example is useful for hole transport materials in light-emitting diode devices.

EXAMPLE 5

Polymerization of N,N'-di-(4-bromophenyl)-N,N'-di-(4-methoxyphenyl)-1,4-phenylenediamine The above example was repeated with N,N'-di-(4-bromophenyl)-N,N'-di-(4-methoxyphenyl)-1,4-phenylenediamine (3.15 g, 5 mmol), triphenylphosphine (0.66 g, 25 mmol), zinc powder (1.00 g, 15 mmol), $NiCl_2$-Bipy (0.05 g, 0.17 mmol), and N-cyclohexylpyrrolidinone (11 mL). The polymerization was carried out for 25 hours at 90° C. and the polymer product (2.0 g, inherent viscosity 0.09 dL/g) was isolated by the same procedure described above. The polymer of this example is useful for hole transport materials in light-emitting diode devices.

EXAMPLE 6

Preparation N,N'-diphenyl-N,N'-di-(3-chlorophenyl)-1,4-phenylenediamine

Following the procedure of Example 1, a mixture of N,N'-diphenyl-1,4-phenylenediamine (13.0 g, 0.05 mol), 3-iodochlorobenzene (31.0 g, 0.13 mol), copper bronze powder (7.5 g, 0.13 mol), 18-crown-6 (2.40 g 0.09 mol), powdered potassium carbonate (50.14 g, 0.36 mol) and 1,2-dichlorobenzene (120 mL) was heated for 20 hours at 190° C. The hot reaction mixture was filtered through a bed, which was washed with toluene (50 mL). Toluene was removed under vacuum from the combined filtrate and the resulting dark brown oil chromatographed on a silica gel column (5×25 cm, 5% $CH_2Cl_2$ in hexane as eluant) to give 7.4 g (31%) of a light yellow viscous oil which solidified upon standing. Recrystallization from methanol-acetone afforded 4.6 g (19%) of monomer product as white flakes (m.p. 124°–127° C.).

EXAMPLE 7

Preparation N,N'-diphenyl-N,N'-di-(3-chlorophenyl)-1,4-phenylenediamine

A mixture of palladium acetate (180 mg, 0.8 mmol) and tri-o-tolylphosphine (536 mg, 1.7 mmol) and toluene (40 mL) was stirred at ambient temperature for 30 minutes until a homogenous yellow solution was formed. N,N'-diphenyl-1,4-phenylenediamine (5.2 g, 20 mmol), 3-bromochlorobenzene (9.6 g, 50 mmol), sodium tert-butoxide (5.4 g, 56 mmol) and more toluene (120 mL) is added to the above mixture in a reactor vessel. With a slow purge of nitrogen, the reaction vessel was placed into an oil-bath and the stirred reaction was heated to reflux for 14 hours. The reaction mixture was cooled to ambient temperature, treated with hydrochloric acid (6 mL), and filtered through a bed. Removal of the solvent on a rotavapor under reduced pressure afforded a dark brown viscous oil. Flash chromatography on a silica gel column (5×25 cm, 10% toluene in hexane as eluent) provided a light-yellow oil, which solidified on standing at ambient temperature. Recrystallization from methanol/acetone afforded 7.3 g (76%) of product as white flakes (m.p 125°–127° C.).

EXAMPLE 8

Polymerization of N,N'-diphenyl-N,N'-di-(3-chlorophenyl)-1,4-phenylenediamine

N,N'-diphenyl-N,N'-di-(3-chlorophenyl)-1,4-phenylenediamine (1.2 g, 2.5 mmol), triphenylphosphine (327.5 mg, 1.25 mmol), zinc powder (490 mg, 7.5 mmol) and $NiCl_2$-Bipy (21.5 mg, 0.075 mmol) were added to a dry reactor. The reactor was evacuated to ~3 mm/Hg and was then filled with nitrogen. This cycle was repeated 5 times. 3.5 mL of N-methylpyrrolidinone was added to the reactor and the reactor was evacuated and filled with nitrogen 3 times. The reaction mixture was stirred and heated in an oil bath at 70° C. for 20 hours. The polymer cake thus formed was dissolved in hot chlorobenzene (40 mL). The solution was filtered and concentrated to about 10 mL. Acetone (100 mL) was added to the solution to precipitate the polymer as a white powder. Washing with acetone and drying in a vacuum oven at 60° C. overnight gave 0.78 g (76%) of polymer product. The properties of the polymer are listed in Table I. The polymer of this example is useful for hole transport materials in light-emitting diode devices.

EXAMPLE 9

Polymerization of N,N'-diphenyl-N,N'-di-(3-chlorophenyl)-1,4-phenylenediamine.

The above Example was repeated at ten times the amounts of all solid reagents. N-Cyclohexyl-pyrrolidinone (13 mL) and N-methylpyrrolidinone (23 mL) were used as the solvent. Polymerization was conducted at 70° C. for 8 hours and 90° C. for 10 hours. The yield of polymer was 8.7 g (85 %). The properties of the polymer are listed in Table I. The polymer of this example is useful for hole transport materials in light-emitting diode devices.

EXAMPLE 10

Polymerization of N,N'-diphenyl-N,N'-di-(3-chlorophenyl)-1,4-phenylenediamine

Example 8 was repeated with the exception that the solvent was a 1:1 mixture of N-cyclohexyl-pyrrolidinone and N-methylpyrrolidinone (total 4 mL). Polymerization was allowed to proceed for 10 hours at 70° C. The product (910 mg, 88%) isolated had an inherent viscosity of 0.13 dL/g in $CH_2Cl_2$. The polymer of this example is useful for hole transport materials in light-emitting diode devices.

EXAMPLE 11

N,N'-diphenyl-N,N'-di-(4-chlorophenyl)-1,4-phenylenediamine

A mixture of palladium acetate (270 mg, 1.2 mmol) and tri-o-tolylphosphine (804 mg, 2.6 mmol) and toluene (20 mL) was stirred at ambient temperature for 30 minutes until a homogenous yellow solution was formed. To this solution were added N,N'-diphenyl-1,4-phenylenediamine (7.8 g, 30 mmol), 4-bromochlorobenzene (18.9 g, 99 mmol), sodium tert-butoxide (8.1 g, 84 mmol) and more toluene (250 mL). With a slow purge of nitrogen, the reaction vessel was placed into an oil-bath and the stirred reaction was heated to reflux for 12 hours. The reaction mixture was cooled to ambient temperature, treated with hydrochloric acid (9 mL), and filtered through a bed of filtering aid. Removal of the solvent on a rotavapor under reduced pressure afforded a dark brown viscous oil. Flash chromatography on a silica gel column (5×25 cm, 50% benzene/hexane as eluent) provided a light-yellow solid. Recrystallization of the benzene/hexane afforded 11.9 g (82%) of product as white flacks. HPLC analysis indicated the product was in >99% purity.

EXAMPLE 12

N,N'-diphenyl-N,N'-di-(4-chlorophenyl)-1,4-phenylenediamine

A 1 L, three-necked, round-bottomed flask, equipped with an overhead stirrer, a nitrogen inlet and a reflux condenser, was charged with N,N'-diphenyl-1,4-phenylenediamine (13.0 g, 0.05 mol), 4-iodochlorobenzene (31.0 g, 0.13 mol), copper bronze powder (12.7 g, 0.20 mol), 18-crown-6 ether (2.6 g, 0.10 mol), powdered potassium carbonate (50.1 g, 0.36 mol) and 1,2-dichlorobenzene (120 mL). With a slow purge of nitrogen through the condenser, the reaction vessel was placed in an oil bath and the stirred reaction was heated at 200° C. for 20 hours. The hot reaction mixture was filtered through a bed of filtering aid, which was washed with toluene (50 mL), and the filtrate was concentrated on a rotavapor under reduced pressure. The solvent residue was further removed with a Kugelrohr apparatus to afford a dark brown viscous oil. Flash chromatography on a silica gel column (5×25 cm, 5% $CH_2Cl_2$ in hexane as eluent) afforded 9.6 g of grey-white solid. The crude product was further washed with toluene and acetone to provide 6.1 g (25%) of off-white powdered material. The polymer of this example is useful for hole transport materials in light-emitting diode devices.

EXAMPLE 13

Polymerization N,N'-diphenyl-N,N'-di-(4-chlorophenyl)-1,4-phenylenediamine

To a dry reactor equipped with a mechanical stirrer, nitrogen/vacuum inlet, and a rubber septum was added N,N'-diphenyl-N,N'-di-(4-chlorophenyl)-1,4-phenylenediamine (12.0 g, 25.0 mmol), triphenylphosphine (3.3 g, 12.6 mmol), zinc powder (4.9 g, 75 mmol), and NiCl$_2$-Bipy (0.22 g, 0.75 mmol). The reactor was evacuated to ~3 mmHg and then purged with nitrogen This cycle was repeated five times. To the reactor was added via syringe 45 mL of N-cyclohexylpyrrolidinone and 27 mL of N-methylpyrrolidinone. The reactor was evacuated and purged with nitrogen another three times. The reaction was heated to 70° C. in an oil bath with a stirring rate of 300 rpm. The grey heterogeneous mixture turned gradually to a red-brown liquid which became more and more viscous with time. The stirring was continued at 70° C. for 10 hours and at 90° C. for 10 hours. At the end of the reaction a dark green-brown viscous material was observed. The crude product was dissolved in hot chlorobenzene (300 mL), filtered through a short alumina column to remove the zinc dust. The filtrate was concentrated on a rotavapor to ~100 mL and the solution was once again passed through an alumina column eluted with THF. The volume of the solution was reduced to ~100 mL and the polymer was precipitated with acetone (500 mL). The product was collected by filtration, washed with acetone and dried in a vacuum oven at 60° C. overnight to give 9.53 g (93%) of light-yellow powders. The properties of the polymer are listed in Table I. The polymer of this example is useful for hole transport materials in light-emitting diode devices.

EXAMPLE 14

Electroluminescence device

An electroluminescent device was fabricated by forming a film (about 80 nm thick) of the polymer of Example 13 by spin coating from a 3% solution in chlorobenzene on ITO-glass (20 ohm/square sheet resistance). This film serves as the hole transport layer. A 2% toluene solution of an emitting polymer, poly(9,9-disubstituted fluorine-2,7-diyl), was applied on top of the hole transport layer by spin coating giving a film of about 100 nm in thickness. Calcium metal was then deposited on top of the emitting polymer by thermal evaporation, serving as the cathode. Upon applying forward bias to the device, blue light was observed at about 9 volt. Light output of 130 cd/m$^2$ was observed at 16 volt, current density of 10 mA/cm$^2$. A similar device without the hole transport layer had a turn-on voltage of about 11 volt, and light output of about 3 cd/m$^2$ at 14 volt, current density of 10 mA/cm$^2$. This illustrates the improvement attainable with the hole transport polymer of this invention.

TABLE I

| | Example 3 | Example 8 | Example 9 | Example 13 |
|---|---|---|---|---|
| Inherent Viscosity | 0.13 dL/g; 0.09 dL/g in chlorobenzene | 0.12 dL/g in CH$_2$Cl$_2$ | 0.13 dL/g | 0.16 dL/g in THF |
| M$_n$ | | | 7200 Daltons | 6300 Daltons |
| M$_w$ | | | 13700 Daltons | 14500 Daltons |
| Tg | | 171° C. | 175° C. | 222° C. |
| Reversible | film: 0.52, | solution: | film: 0.63, | film: 0.6111, |

TABLE I-continued

| | Example 3 | Example 8 | Example 9 | Example 13 |
|---|---|---|---|---|
| Oxidation Potentials | 0.84 v solution: 0.41, 0.86 | 0.54 v | 1.00 v solution: 0.52, 0.92 v | 0.96 v Solution: 0.60, 1.0 |
| Blue Fluorescence | solution and film | solution and film | solution and film | solution and film |

What is claimed is:

1. A poly(arylamine) composition comprising one or more compounds of Formula (I):

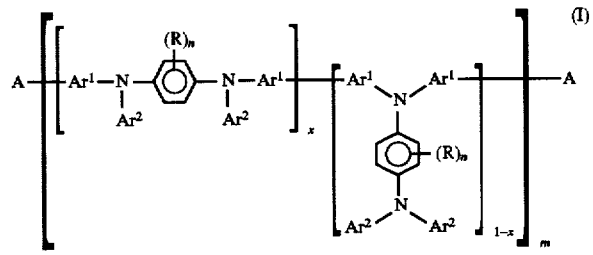

wherein:

R is independently in each occurrence a C$_{1-24}$ hydrocarbyl, C$_{1-24}$ hydrocarboxy, C$_{1-24}$ hydrocarbylthiooxy, or C$_{1-24}$ hydrocarbylcarboxyl;

Ar$^1$ and Ar$^2$ are independently in each occurrence a C$_{6-18}$ aryl moiety optionally substituted with a C$_{1-12}$ hydrocarbyl, C$_{1-12}$ hydrocarbyloxy, C$_{1-12}$ hydrocarbylthiooxy, or C$_{1-12}$ hydrocarbylcarboxyl;

A is independently in each occurrence hydrogen or a halogen;

x is independently in each occurrence a positive number from 0 to 1;

n is independently in each occurrence a whole number of from 0 to 4; and m is a number of from about 5 to about 1000.

2. A composition according to claim 1 wherein:

R is independently in each occurrence a C$_{1-12}$ alkoxy, C$_{1-12}$ thioalkoxy, C$_{1-12}$ aryloxy, or C$_{1-12}$ thioaryloxy moiety optionally substituted with C$_{1-12}$ alkoxy, C$_{1-12}$ thioalkoxy, C$_{1-12}$ aryloxy, or C$_{1-12}$ thioaryloxy moieties;

Ar$^1$ and Ar$^2$ are independently in each occurrence a C$_6$ to C$_{18}$ aromatic radical optionally substituted with C$_{1-12}$ alkoxy, C$_{1-12}$ thioalkoxy, C$_{1-12}$ aryloxy, or C$_{1-12}$ thioaryloxy moieties;

A is independently in each occurrence hydrogen, chlorine or bromine; and m is a number of from about 5 to about 500.

3. A composition according to claim 2 wherein:

R is independently in each occurrence a C$_{1-5}$ alkoxy, C$_{1-5}$ thioalkoxy or a C$_{1-6}$ hydrocarbyl;

Ar$^1$ and Ar$^2$ are independently in each occurrence derived from benzene, naphthalene or biphenyl, optionally substituted with C$_{1-5}$ alkoxy or C$_{1-6}$ hydrocarbyl;

n is independently in each occurrence a whole number of 0 or 1; and m is a number of from about 5 to about 100.

4. A composition according to claim 3 wherein:

R is independently in each occurrence methyl or methoxy;

Ar$^1$ and Ar$^2$ are independently in each occurrence derived from anisole, methoxynapthalene, benzene or toluene;

and m is a number of from about 5 to about 100.

5. A composition according to claim 4 wherein:
Ar¹ is independently in each occurrence phenylene;
Ar² is independently in each occurrence derived from 4-methoxyphenyl or benzene;
n is independently in each occurrence a whole number of 0; and
m is a number of from about 5 to about 100.

6. A process for the preparation of a composition according to claim 1 which comprises contacting one or more monomers corresponding to one or more of Formulas (II) and (III):

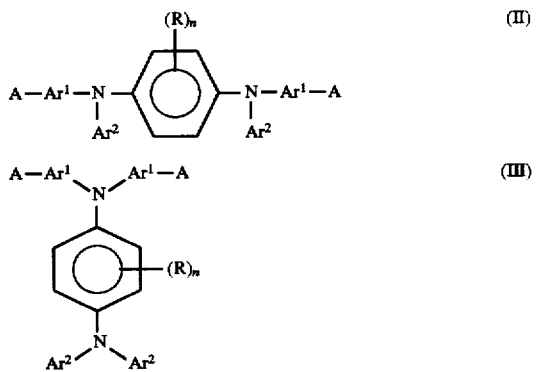

with a catalytic amount of a divalent nickel salt, at least a stoichiometric amount of a material capable of reducing the divalent nickel ion to the zero valent state and a material capable of acting as a ligand and an amount of a compound capable of accelerating the reaction in a polar solvent and an optional co-solvent comprising an aromatic hydrocarbon or ether under conditions sufficient to form said composition.

7. The process of claim 6 wherein the monomers are prepared by contacting a haloaromatic compound with one or more diaryldiamines corresponding to one or more of Formulas (IV) and (V):

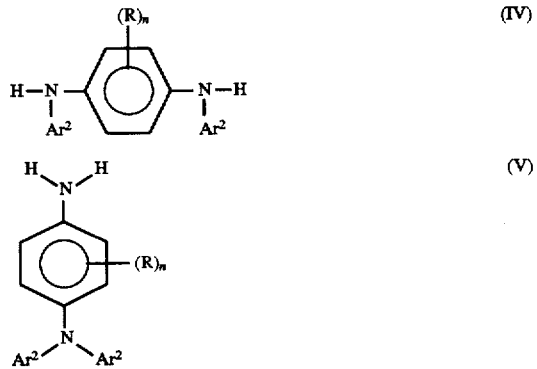

under conditions such that compounds of Formula (II) or Formula (III) are formed.

8. The process of claim 7 wherein the haloaromatic compound comprises compounds of Formula (VI):

wherein A and B are independently in each occurrence a hydrogen or halogen and Ar¹ is independently in each occurrence a $C_{6-18}$ aryl moiety optionally substituted with a moiety that does not interfere in the polymerization reaction.

9. The process of claim 8 wherein A is hydrogen, chlorine or bromine and B is bromine or iodine and Ar¹ is independently in each occurrence derived from napthalene, biphenyl, anisole, methoxynapthalene, methoxybiphenyl, benzene or toluene.

10. The process of claim 9 wherein one or more compounds of Formula (IV) and (V) are reacted with compounds of Formula (VI): A—Ar¹—B in the presence of a catalyst.

11. The process of claim 10 wherein the catalyst is copper powder or palladium and tri-o-tolylphosphine.

12. The process of claim 11 wherein the amount of catalyst is about 0.1 mole percent to about 1000 mole percent relative to the amount of the haloaromatic compound.

13. The process of claim 6 wherein the divalent nickel salt is present in am amount of from about 0.1 to about 10 mole percent based on the amount of monomer, the material capable of reducing the divalent nickel ion to the zero valent state is zinc powder and is present in an amount of about 10 to about 500 mole percent based on the amount of monomer, the material capable of acting as a ligand is triarylphosphine and is present in an amount of about 10 to about 100 mole percent based on the amount of monomer and the amount of compound capable of accelerating the reaction is present from about 10 to about 100 mole percent based on the divalent nickel salt.

14. The process of claim 6 wherein the temperature of the reaction is about 50° C. to about 150° C.

15. A film comprising the composition of claim 1.

16. A process for the preparation of a film comprising applying a composition according to claim 1 to a substrate and exposing the applied composition to conditions such that a film is formed.

17. The film of claim 15 which has a thickness of from about 0.01 to about 200 microns.

* * * * *

UNITED STATES PATENT AND TRADEMARK OFFICE
CERTIFICATE OF CORRECTION

PATENT NO. : 5,728,801

DATED : March 17, 1998

INVENTOR(S) :
Weishi Wu; Edmund P. Woo; William R. Shiang

It is certified that error appears in the above-indentified patent and that said Letters Patent is hereby corrected as shown below:

Column 15, claim 6, line 28, following structure III insert -- wherein R, $Ar^1$, $Ar^2$, A and n are defined as in claim 1 --

Column 15, claim 7, line 53, following structure V insert -- wherein R, $Ar^2$ and n are defined as in claim 1 --

Column 16, claim 10, line 20 following catalyst insert -- wherein A, B and $Ar^1$ are defined as in claim 9 --

Signed and Sealed this

Twenty-seventh Day of March, 2001

Attest:

Attesting Officer

NICHOLAS P. GODICI

Acting Director of the United States Patent and Trademark Office